TABLE III

Other aryl 3-(5-tert.-butyl-2,3-dimethyl-4-hydroxyphenyl)propionates

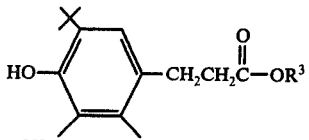

| Compound No. | Structure R³ | m.p. °C |
|---|---|---|
| 22 |  | 112–114 |
| 23 | (2-methylphenyl) | 90–92 |
| 24 | (4-tert-butylphenyl) | 138–140 |

EXAMPLE 9

Neopentanetriyl tris-(5-tert.-butyl-2,3-dimethyl-4-hydroxyphenylacetate)

24.2 grams of 5-tert.-butyl-2,3-dimethyl-4-hydroxyphenylacetic acid, 3.6 grams of 1,1,1-trimethylolethane and 0.746 grams of dibutyltin oxide were dispersed in 35 ml of dry xylene and 3 ml of dry dimethyl sulfoxide and heated to distill out xylene solvent until a reflux temperature of 152° to 155° was reached. The reaction mixture then became homogeneous and was heated with stirring at this temperature for 18 hours, and then for an additional 6.5 hours at 157°–160°. The reaction mixture was dissolved in 800 ml chloroform and successively washed with water, saturated aqueous sodium bicarbonate solution and again with water until the pH of the water water was neutral. The reaction solution was then dried over anhydrous sodium sulfate. Th clear filtrate was evaporated at reduced pressures yielding a residue which became crystalline or trituration with a boiling mixture of 80 ml of hexane and 70 ml of toluene. After successive crystallizations from isopropanol and then toluene, the product was obtained as white crystals melting at 159°–164° (Compound 25).

By a procedure similar to Example 9, the compounds presented in Table IV were prepared.

TABLE IV

| Compound No. | x | n | R³ | M.P.° C |
|---|---|---|---|---|
| 27 | 1 | 2 | (—CH₂CH₂)₂S | 118–124 |
| 28 | 2 | 2 | (—CH₂CH₂)₂S | viscous syrup⁽¹⁾ |

TABLE IV-continued

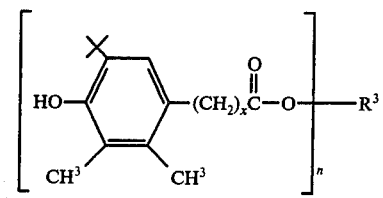

| Compound No. | x | n | R³ | M.P.° C |
|---|---|---|---|---|
| 29 | 1 | 4 | —CH₂—C(CH₂—)(CH₂—)—CH₂— | 186–189 |

Note:
⁽¹⁾Purified by silica gel column chromatography yielding a light yellow syrup.

EXAMPLE 10

2,2-Dimethyl-1,2,2-pentanetriyl tris-(5-tert.-butyl-2,3-dimethyl-4-hydroxyphenylacetate)

A mixture of 2.54 grams of 1,1,1-trimethylolbutane together with 13.5 grams of methyl 5-tert.-butyl-2,3-dimethyl-4-hydroxyphenylacetate and 13.7 milligrams of lithium hydride was heated together under nitrogen at 115° for 20 minutes, then 140° for 30 minutes, 170° for 1 hour, the mixture then being held at 190° to 195° for 4 hours. During this heating cycle the evolved methanol was removed by distillation. After removal of the unreacted methyl 5-tert.-butyl-2,3-dimethyl-4-hydroxyphenylacetate by distillation at reduced pressures, the residue was dissolved in benzene and the benzene solution was acidified with 1 ml of acetic acid. The benzene solution was freed of a small amount of insoluble material by filtration. The benzene solution containing product was then washed with 5% aqueous sodium carbonate and dried over sodium sulfate yielding the product in crude form as a glassy residue. After purification by dry-column chromatography using silica gel, the product was obtained as white crystals melting at 73° to 75° C after crystallization from a solvent mixture of benzene-hexane (Compound 30).

EXAMPLE 11

3,6-Dioxa-1,8-octamethylene bis-{3-(5-tert.-butyl-2,3-dimethyl-4-hydroxyphenyl)-propionate} a. 3-(5-tert.-butyl-2,3-dimethyl-4-hydroxyphenyl) propionic acid

Under nitrogen, a solution of methyl 3-(5-tert.-butyl-2,3-dimethyl-4-hydroxyphenyl)propionate (71.5 g) in 150 ml of ethanol was treated with a solution of 98% sodium hydroxide (12.1 g) in 15 ml of water, and the mixture was heated under reflux for 3 hours. The cold solution was diluted with water to about 1200 ml and then acidified with concentrated hydrochloric acid. The precipitated solid was filtered off and washed with water. Recrystallization from 600 ml of acetonitrile gave the acid, m.p. 191° to 193° C.

b. A stirred mixture of 12.0 grams of 3-(5-tert.-butyl-2,3-dimethyl-4-hydroxyphenyl)propionic acid, 3.0 grams of triethylene glycol and 0.6 milliliters of titanium tetraisopropylate in 200 ml of dry xylene was heated at reflux for 18 hours, the evolved water being

QUINOPHTHALONE DYESTUFFS

The present invention relates to water-insoluble quinophthalone dyestuffs of the formula I

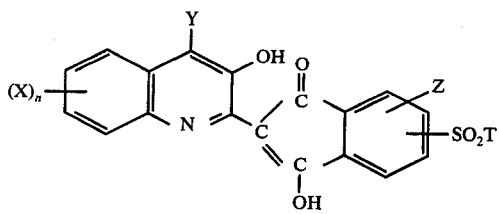

in which
T represents W—Ar or

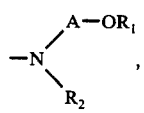

and
Ar denotes aryl,
W denotes oxygen, sulphur or N-R,
R denotes hydrogen or alkyl,
A denotes alkylene,
$R_1$ denotes alkyl or aryl,
$R_2$ denotes hydrogen or alkyl,
X denotes halogen, alkyl, alkoxy, nitro or acylamino,
Y denotes hydrogen or halogen,
Z denotes hydrogen, alkyl or halogen and
n denotes a number from 0 to 3
as well as to their preparation, and their use for dyeing organic materials, especially for dyeing and printing hydrophobic synthetic fibre materials.

Suitable aryl radicals Ar and $R_1$ are naphthyl radicals and, preferably, phenyl radicals, which can optionally be monosubstituted, disubstituted or trisubstituted by halogen, $C_1$-$C_4$-alkyl, $C_1$-$C_4$-alkoxy, phenyl or phenoxy, but also CN, $NO_2$, S—$CH_3$, —COO—$CH_3$ and OH.

Suitable alkyl radicals R, X and Z are those with 1 to 4 C atoms, methyl and ethyl being preferred. The alkyl radical R can also be substituted, for example by CN, OH, methoxy or Cl.

Suitable alkoxy radicals X are those with 1 to 4 C atoms, methoxy and ethoxy being preferred.

Suitable acylamino radicals X are $C_1$- to $C_4$-alkylcarbonylamino radicals, acetylamino being preferred.

Halogen is preferably to be understood as chlorine and bromine.

Preferably, n represents 0, 1 or 2.

"Bulky" radicals such as, for example, t-butyl, are in positions where they do not cause steric hindrance, that is to say, for example, in the m- or p-position of a benzene ring.

Preferred dyestuffs of the formula I are those of the formula indicated, wherein
Ar denotes phenyl, chlorophenyl, dichlorophenyl, tolyl, methoxyphenyl, dimethylphenyl and trimethylphenyl,
X denotes Cl, Br, $CH_3$ or $CH_3O$,
Y denotes H or Br,
Z denotes H,
W denotes O or NR,
R denotes H, $CH_3$ or $C_2H_5$ and
n denotes 0, 1 or 2.

Particularly preferred dyestuffs of the formula I are those wherein
W represents NR.

Suitable alkylene radicals A are straight-chain or branched alkylene radicals, optionally interrupted by O, with 2 to 6 C atoms, preferably —$C_2H_4$—, —$C_3H_6$— and —$C_4H_8$—.

Suitable alkyl radicals $R_1$, $R_2$, X and Z are those with 1 to 4 C atoms, methyl and ethyl being preferred.

Preferred dyestuffs of the formula (I) are those of the formula indicated,
wherein
A represents —$(CH_2)_m$—,
X represents Cl, Br, $CH_3$ or $CH_3O$,
Y represents H or Br,
Z represents H,
$R_1$ represents $CH_3$ or $C_2H_5$,
$R_2$ represents H, $CH_3$ or $C_2H_5$,
n represents 0, 1 or 2 and
m represents 2, 3 or 4.

The new dyestuffs of the formula I are obtained either by reacting phthalic acids or their anhydrides of the formulae II

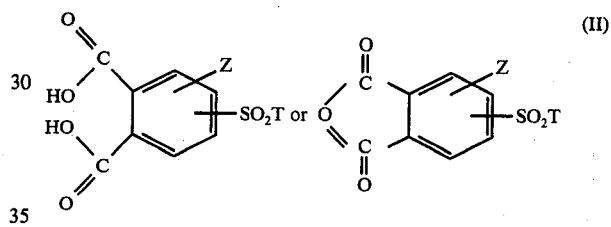

in which
T and Z have the indicated meaning, with 3-hydroxyquinaldines of the formula III

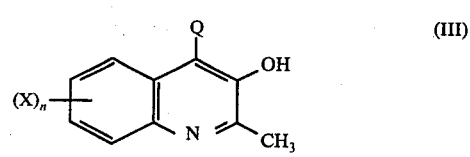

in which X and n have the indicated meaning and Q represents hydrogen or a carboxyl group, the optionally present carboxyl group Q being split off, or by reacting quinophthalone-sulphonic acid chlorides of the formula IV

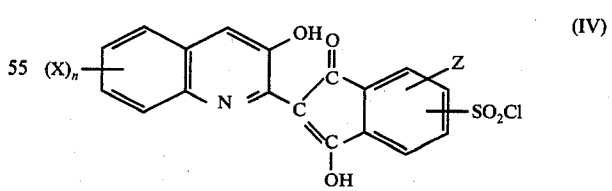

in which Z, X and n have the indicated meaning, in a manner which is in itself known with compounds of the formula

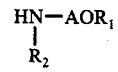

EXAMPLE 82

N,N'-Ethylenebis-{3-(5-tert.-butyl-2,3-di-methyl-4-hydroxyphenyl)propionamide}

A mixture consisting of 22.21 grams of methyl 3-(5-tert.-butyl-2,3-dimethyl-4-hydroxyphenyl)propionate and 2.4 grams of ethylenediamine were melted together and gradually heated from 91° to 172° over a period of 18.5 hours and then maintained at 172° for an additional 2 hours while removing the methanol of reaction by distillation. The product was successively crystallized from a solvent mixture of ethanol-water and then from acetonitrile to yield white crystals melting at 214° to 217° (Compound 36).

N,N'-1,2-propylenebis-{3-(5-tert.-butyl-2,3-dimethyl-4-hydroxyphenyl)propionamide} is made in a similar manner by substituting 1,2-propylenediamine for ethylenediamine in the above procedure.

EXAMPLE 83

N,N'-Hexamethylenebis-{3-(5-tert.-butyl-2,3-dimethyl-4-hydroxyphenyl)propionamide}

This product was made by a similar procedure as that described in Example 82 by substituting 1,6-hexanediamine for ethylenediamine. After successive crystallization from a solvent mixture of carbon tetrachloride-1,2-dichloroethane, methanol-water and finally from chloroform, the product was obtained as white crystals melting at 176° to 178° (Compound 37).

N,N'-dodecamethylenebis-{3-(5-tert.-butyl-2,3-dimethyl-4-hydroxyphenyl)propionamide}is made by a similar procedure to that described in Example 82 by substituting 1,2-dodecamethylenediamine for ethylenediamine.

EXAMPLE 84

N,N'-Bis-{3-(5-tert.-butyl-2,3-dimethyl-4-hydroxyphenyl)propionyl}piperazine A mixture consisting of 20.0 grams of methyl 3-(5-tert.-butyl-2,3-dimethyl-4-hydroxyphenyl)propionate and 3.1 grams of piperazine was gradually heated from 120° to 175° over 6.5 hours and maintained at 175° to 180° for an additional 4 hours in a nitrogen atmosphere while removing the methanol of reaction by distillation. The reaction product was purified by repeated extractions with fresh hot toluene and finally with 95% ethanol to yield the purified product as a white solid melting at 221° to 224° (Compound 38).

EXAMPLE 85

N,N'-3,6-Dioxa-1,8-octamethylenebis-[3-(5-tert-butyl-2,3-dimethyl-4-hydroxyphenyl)propionamide]

A mixture consisting of 18.9 grams of methyl 3-(5-t-butyl-2,3-dimethyl-4-hydroxyphenyl)propionate and 5.0 grams (0.034 moles) of 3,6-dioxa-1,8-octanediamine was heated under a nitrogen atmosphere for 7½ hours during which time the temperature was gradually raised from 135° to 175°. Heating was continued for 6¼ hours longer at 175° to 180°. The methanol by-product weighed 20.53 g. The product was purified by extractions with 5% hydrochloric acid and water. Final purification was achieved by means of chromatography using alumina and chloroform. This afforded 4.9 grams of a white glass having melting point 72° to 95° (Compound 39).

Oven aging tests were run on compounds 33 to 39 using the same procedures of sample preparation and evaluation as detailed for Table V. The results of these oven againg tests are listed in Table VI.

TABLE VI
Oven Aging of Polypropylene Plaques Containing 2,3,5-Trialkyl-4-hydroxyphenyl Alkanamides

| Ex. No | Percent | Stabilizer | | Hours to Failure |
|---|---|---|---|---|
| 86 | Unstabilized | | | 3 |
| 87 | 0.2% | Compound 33 | | < 20 |
| 88 | 0.1% | " | 33 + 0.3% DSTDP | 165 |
| 89 | 0.2% | " | 34 | 105 |
| 90 | 0.1% | " | 34 + 0.3% DSTDP | 735 |
| 91 | 0.2% | " | 35 | 175 |
| 92 | 0.1% | " | 35 + 0.3% DSTDP | 950 |
| 93 | 0.2% | " | 36 | 105 |
| 94 | 0.1% | " | 36 + 0.3% DSTDP | 750 |
| 95 | 0.2% | " | 37 | 90 |
| 96 | 0.1% | " | 37 + 0.3% DSTDP | 780 |
| 97 | 0.2% | " | 38 | 65 |
| 98 | 0.1% | " | 38 + 0.3% DSTDP | 1855 |
| 99 | 0.2% | " | 39 | 100 |
| 100 | 0.1% | " | 39 + 0.3% DSTDP | 415 |

What is claimed is:

1. A compound having the formula

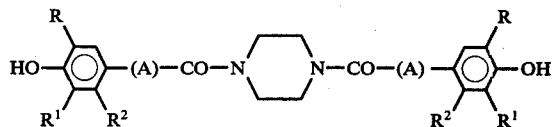

wherein
R is branched alkyl of 3 to 8 carbon atoms,
$R^1$ and $R^2$ are alkyl of 1 to 3 carbon atoms, and
A is straight chain alkylene of 1 to 3 carbon atoms.

2. A compound of claim 1 wherein R is a branched chain alkyl and $R^1$ and $R^2$ are straight chain alkyl.

3. The compound of claim 1, N,N'-bis[3-(5-tert-butyl-2,3-dimethyl-4-hydroxyphenyl)propionyl]piperazine.

4. A compound according to claim 1 wherein
R is tert-butyl,
$R^1$ and $R^2$ are methyl, and
A is methylene or ethylene.

* * * * * substituent Y = halogen can also be effected in accordance with known methods, for example in accordance with the data in German Patent Specification No. 1,229,663 and in British Patent Specification No. 1,263,345, by treating dyestuffs of the formula (I), in which Y = H, with halogen, preferably bromine, if appropriate at elevated temperature in inert organic solvents.

The new dyestuffs of the formula (I), optionally also mixed with one another or with dyestuffs of similar structure such as, for example, those of the formula I, in which
the group -W-Ar is replaced by the radical

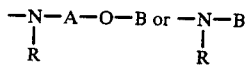

wherein
A represents a $C_2-C_6$-alkylene radical and
B represents $C_1-C_4$-alkyl and
R has the abovementioned meaning,
are outstandingly suitable for dyeing organic materials, especially for dyeing and/or printing synthetic hydrophobic fibre materials from an aqueous liquor. They are dyed or printed in accordance with the methods customary for the fibres. Cellulose triacetate fibres and polyamide fibres can be dyed at about 100° C from aqueous liquors, if appropriate in the presence of customary auxiliaries. When dyeing fibres of aromatic polyesters, for example polyethylene glycol terephthalate, the customary carriers can be added to the dyebath, or the dyeing can be carried out without added carrier at 120°–130° C under pressure. The dyeings can also be fixed by a brief heat treatment at 190°–220° C. It is advantageous to bring the dyestuffs, before use, to a finely divided state in accordance with the customary methods, for example by grinding or kneading, preferably in the presence of customary dispersing agents.

The new dyestuffs and their mixtures are distinguished by good affinity to polyester fibres and good general fastness properties.

In the Examples which follow, the parts indicated are parts by weight and the degrees are degrees centigrade.

In the Examples which follow, the parts indicated are parts by weight and the degrees are degrees centigrade.

EXAMPLE 1

19.3 parts of phthalic acid-4-sulphonic acid phenyl ester (obtained by reaction of phthalic acid-4-sulphonic acid chloride with sodium phenolate) are convertd to the anhydrideby heating in 260 parts of o-dichlorobenzene to 175°–180°. In the course thereof, the water produced is distilled off together with 60 parts of o-dichlorobenzene 12 parts of benzoic acid and 10.15 parts of 3-hydroxyquinaldine-4-carboxylic acid are then introduced under a nitrogen atmosphere and the reaction mixture is stirred at 170°–180° until the formation of dyestuff is complete; in the course thereof, again, the water produced is distilled off together with a little o-dichlorobenzene. Thereafter the residual o-dichlorobenzene is largely distilled off under reduced pressure, the residue which remains is diluted with 80 parts of methanol, and the mixture is cooled to 15°–20°. The reaction product which has separated out is filtered off and washed with methanol. After drying, 19.5 parts of the dyestuff of the formula

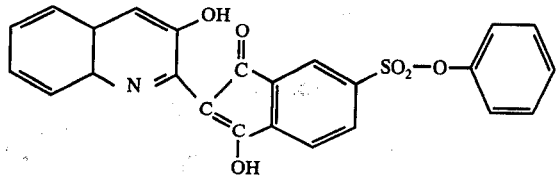

are obtained. The dyestuff gives a reddish-tinged yellow dyeing of good fastness properties on polyester materials.

EXAMPLE 2

20.1 parts of phthalic acid-4-sulphonic acid 3'-methylphenyl ester (obtained by reaction of phthalic acid-4-sulphonic acid chloride with the sodium salt of m-cresol) are introduced into 200 parts of 2,4-dichlorotoluene and converted to the anhydride by heating to 175°–180°. In the course thereof, the water produced is distilled off together with 50 parts of 2,4-dichlorotoluene. Thereafter, 12 parts of benzoic acid and 7.95 parts of 3-hydroxyquinaldine are added to the melt under a nitrogen atmosphere and the reaction mixture is stirred at 170°–180° C until the reaction is complete. In the course thereof, again, the water produced is distilled off together with a little 2,4-dichlorotoluene.

After removing the residual solvent by distillation under reduced pressure, the residue which remains is stirred with 80 parts of methanol, the mixture is cooled to 15°–20° and filtered, and the filter residue is rinsed with methanol. After drying, 19.7 parts of the dyestuff of the formula

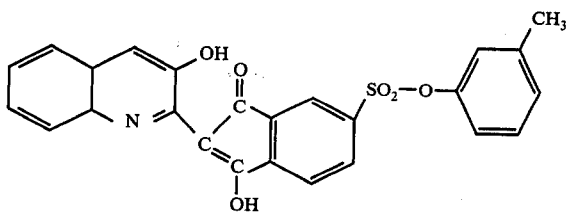

are obtained. The dyestuff gives a reddish-tinged yellow dyeing of good fastness properties on polyester materials.

EXAMPLE 3–36

Analogously to the description in Examples 1 and 2, tje 3'-hydroxyquinopthalone dyestuffs of the general formula

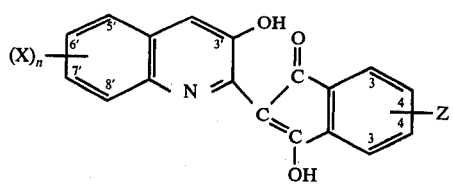

listed in the Table which follows are obtained on using the corresponding phthalic acid derivatives or their anhydrides:

| Example | X | n | | Z | Shade on polyester |
|---|---|---|---|---|---|
| 3 | H | — | 4- | 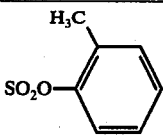 | reddish-tinged yellow |
| 4 | H | — | 4- |  | golden yellow |
| 5 | H | — | 3- | 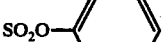 | yellow |
| 6 | H | — | 3- |  | yellow |
| 7 | 5',7'-CH$_3$ | 2 | 4 |  | reddish-tinged yellow |
| 8 | 6',8'-Cl | 2 | 4 |  | reddish-tinged yellow |
| 9 | 6'-Br | 1 | 4 |  | reddish-tinged yellow |
| 10 | 5',7'-CH$_3$ | 2 | 4 | 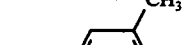 | reddish-tinged yellow |
| 11 | H | — | 4 |  | yellow |
| 12 | H | — | 4 |  | yellow |
| 13 | H | — | 4 | 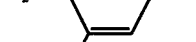 | yellow |
| 14 | H | — | 4 | 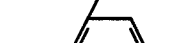 | yellow |
| 15 | H | — | 4 | 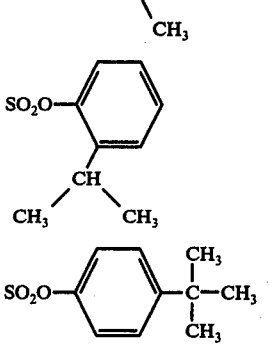 | yellow |

-continued
| Example | X | n | Z | Shade on polyester |
|---|---|---|---|---|
| 16 | H | — 4 | 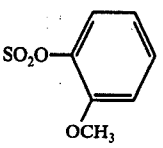 | reddish-tinged yellow |
| 17 | H | — 4 | 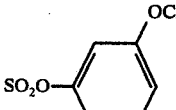 | reddish-tinged yellow |
| 18 | H | — 3 | 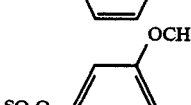 | yellow |
| 19 | H | — 4 | 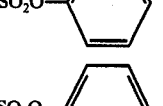 | yellow |
| 20 | H | — 4 | 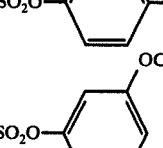 | yellow |
| 21 | H | — 4 | 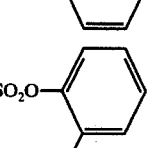 | yellow |
| 22 | H | — 4 | 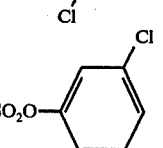 | yellow |
| 23 | H | — 4 | 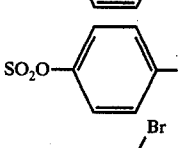 | yellow |
| 24 | H | — 4 | 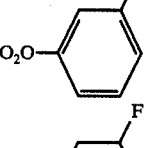 | yellow |
| 25 | H | — 4 | 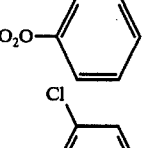 | yellow |
| 26 | H | — 4 | 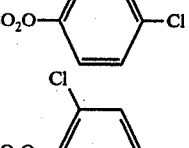 | yellow |
| 27 | H | — 4- | 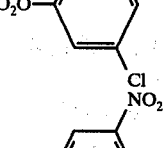 | yellow |
| 28 | H | — 4 | 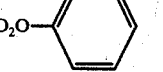 | yellow |

-continued

| Example | X | n | Z | Shade on polyester |
|---------|---|---|---|---|
| 29 | H | — 4 | 3-(SO₂O-)phenol (OH) | yellow |
| 30 | H | — 4 | 4-Cl-3-(SO₂O-)-toluene | golden yellow |
| 31 | H | — 4 | 2,5-dimethyl-(SO₂O-)benzene | reddish-tinged yellow |
| 32 | H | — 4 | 1-(SO₂O-)naphthalene | yellow |
| 33 | H | — 4 | 2-(SO₂O-)naphthalene | yellow |
| 34 | H | — 4 | 2-CH₃-3-SCH₃-(SO₂O-)benzene | yellow |
| 35 | H | — 4 | 3-(SO₂O-)-COOC₂H₅-benzene | yellow |
| 36 | H | — 4 | 3-(SO₂O-)-CN-benzene | yellow |

EXAMPLE 37

22 parts of phthalic acid-4-sulphonic acid N-3'-methyl-phenyl-amide (obtained by reaction of phthalic acid-4-sulphonic acid chloride with m-toluidine) are converted to the anhydride by heating in 260 parts of o-dichlorobenzene to 175°–180°. In the course thereof, the water produced is distilled off together with 60 parts of o-dichlorobenzene. 12 parts of benzoic acid and 10.15 parts of 3-hydroxyquinaldine-4-carboxylic acid are then introduced under a nitrogen atmosphere and the reaction mixture is stirred at 170°–180° until dyestuff formation is complete; in the course thereof, again, the water produced is distilled off together with a little o-dichlorobenzene. Thereafter, the residual o-dichlorobenzene is removed by vacuum distillation and the residue which remains is diluted with methanol and cooled to 15°–20°. The reaction product which has separated out is filtered off and washed with methanol. After drying, 20.5 parts of the dyestuff of the formula

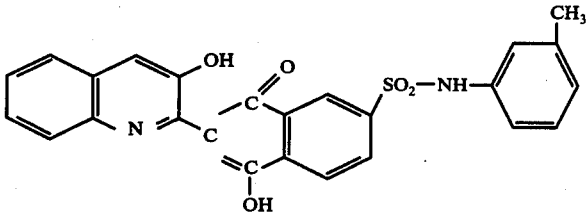

are obtained. The dyestuff gives a golden yellow dyeing of good fastness properties on polyester materials.

EXAMPLE 38

18 parts of phthalic acid-4-sulphonic acid N-phenylamide (obtained by reaction of phthalic acid-4-sulphonic acid chloride with aniline) are introduced into 200 parts of 2,4-dichlorotoluene and converted to the anhydride by heating to 175°-180°. In the course thereof, the water produced is distilled off together with 50 parts of 2,4-dichlorotoluene. 12 parts of benzoic acid and 7.95 parts of 3-hydroxyquinaldine are then added to the melt under a nitrogen atmosphere and the reaction mixture is stirred at 170° to 180° until formation of the dyestuff is complete. In the course thereof, again, the water produced is distilled off together with a little 2,4-dichlorotoluene. After removing the residual solvent by distillation under reduced pressure, the residue which remains is stirred with 80 parts of methanol, the mixture is cooled to 15°-20° and filtered, and the filter residue is rinsed with methanol. After drying, 18 parts of the dyestuff of the formula

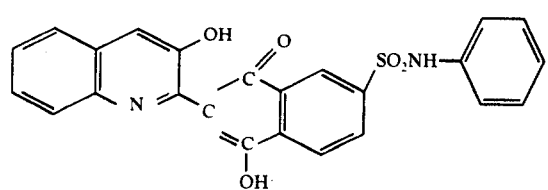

are obtained. The dyestuff gives a golden yellow dyeing of good fastness properties on polyester materials.

EXAMPLE 39

21 parts of phthalic acid-4-sulphonic acid N-3'-methoxy-phenyl-amide (obtained by reaction of phthalic acid-4-sulphonic acid chloride with 3-methoxy-aniline) and 10.15 parts of 3-hydroxyquinaldine-4-carboxylic acid are introduced into 200 parts of 2,4-dichlorotoluene. The reaction mixture is heated to 180°-190° and is stirred at this temperature until dyestuff formation is complete. In the course thereof, the water produced is distilled off together with about 60 parts of dichlorotoluene. After removing the residual solvent by vacuum distillation, the residue which remains is diluted with methanol and the dyestuff which has separated out is filtered off at 15°-20°, washed with methanol and dried. 17.7 parts of the dyestuff of the formula

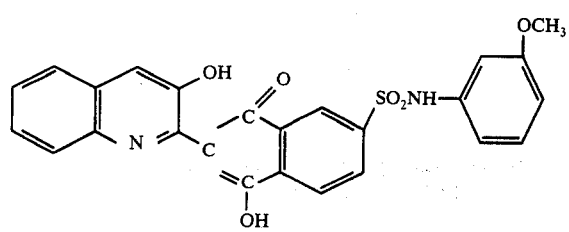

are obtained. The dyestuff gives a golden yellow dyeing of good fastness properties on polyester materials.

EXAMPLE 40-76

Analogously to the description in Examples 37-39, the 3'-hydroxyquinophthalone dyestuffs of the general formula

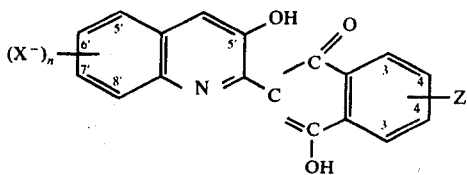

listed in the Table which follows are obtained on using the corresponding phthalic acid derivatives or their anhydrides:

| Ex. | X | n | Z | Shade on PE |
|---|---|---|---|---|
| 40 | H | — | 4— SO$_2$NH—⟨phenyl⟩—CH$_3$ (ortho) | yellow |
| 41 | H | — | 4— SO$_2$NH—⟨phenyl⟩—CH$_3$ | yellow |
| 42 | H | — | 4— SO$_2$NH—⟨phenyl⟩—OCH$_3$ | yellow |
| 43 | H | — | 4— SO$_2$NH—⟨phenyl⟩—HO | yellow |
| 44 | H | — | 3— SO$_2$NH—⟨phenyl⟩—CH$_3$ | golden yellow |
| 45 | H | — | 3— SO$_2$NH—⟨phenyl⟩—OCH$_3$ | yellow |
| 46 | H | — | 4— SO$_2$N(CH$_3$)—⟨phenyl⟩ | yellow |
| 47 | H | — | 3— SO$_2$N(CH$_3$)—⟨phenyl⟩ | yellow |
| 48 | 5',7'-CH$_3$ | 2 | 4— SO$_2$NH—⟨phenyl⟩—CH$_3$ | yellow |
| 49 | 6'-Br | 1 | 4— SO$_2$NH—⟨phenyl⟩—CH$_3$ | yellow |
| 50 | H | — | 4— SO$_2$N(C$_2$H$_5$)—⟨phenyl⟩—CH$_3$ | yellow |
| 51 | H | — | 4 SO$_2$NH—⟨phenyl⟩—C$_2$H$_5$ | yellow |
| 52 | H | — | 4 SO$_2$NH—⟨phenyl⟩(CH$_3$)(CH$_3$) | yellow |
| 53 | H | — | 4 SO$_2$NH—⟨phenyl⟩(CH$_3$)(CH$_3$) | yellow |

-continued

| Ex. | X | n | Z | Shade on PE |
|---|---|---|---|---|
| 54 | H | — | 4 | SO$_2$NH—[2,5-dimethylphenyl] | yellow |
| 55 | H | — | 4 | SO$_2$NH—[3-ethoxyphenyl] | yellow |
| 56 | H | — | 4 | SO$_2$NH—[3-isopropylphenyl] | yellow |
| 57 | H | — | 4 | SO$_2$NH—[4-tert-butylphenyl] | yellow |
| 58 | H | — | 4 | SO$_2$NH—[2,4-dimethoxyphenyl] | yellow |
| 59 | H | — | 4 | SO$_2$NH—[2,5-dimethoxyphenyl] | golden yellow |
| 60 | 6′,8′-Cl | 2 | 4 | SO$_2$NH—[2,5-dimethoxyphenyl] | yellow |
| 61 | H | — | 4 | SO$_2$NH—[2-chlorophenyl] | yellow |
| 62 | H | — | 4 | SO$_2$NH—[3-chlorophenyl] | yellow |
| 63 | H | — | 4 | SO$_2$NH—[4-chlorophenyl] | yellow |
| 64 | H | — | 4 | SO$_2$NH—[3-bromophenyl] | yellow |
| 65 | H | — | 4 | SO$_2$N(C$_2$H$_5$)—[2-chlorophenyl] | yellow |
| 66 | H | — | 4 | SO$_2$N(C$_2$H$_5$)—[3-chlorophenyl] | yellow |
| 67 | H | — | 4 | SO$_2$N(C$_2$H$_5$)—[3-fluorophenyl] | yellow |
| 68 | H | — | 4 | SO$_2$NH—[3-trifluoromethylphenyl] | yellow |
| 69 | H | — | 4 | SO$_2$NH—[2,4-dichlorophenyl] | yellow |
| 70 | H | — | 4 | SO$_2$NH—[2,5-dichlorophenyl] | yellow |
| 71 | H | — | 4 | SO$_2$NH—[2,5-dimethyl-4-chlorophenyl] | yellow |
| 72 | H | — | 4 | SO$_2$NH—[3-nitrophenyl] | yellow |
| 73 | H | — | 4 | SO$_2$NH—[3-cyanophenyl] | yellow |
| 74 | H | — | 4 | SO$_2$NH—[4-(1-methoxycarbonyl-1-methyl)ethylphenyl] | yellow |
| 75 | H | — | 4 | SO$_2$NH—[2,3-dimethylphenyl] | yellow |
| 76 | H | — | 4 | SO$_2$NH—[1-naphthyl] | yellow |

EXAMPLE 77

5-parts of 3-hydroxy-quinophthalone-4′-N-phenylsulphamide (prepared according to Example 38) are suspended in 200 parts of glacial acetic acid and 4.5 parts of bromine are added. The reaction mixture is stirred for 15 hours at 15°–25° and is then filtered. The residue is washed with bisulphite solution and water and dried. 5.4 g of the dyestuff of the formula

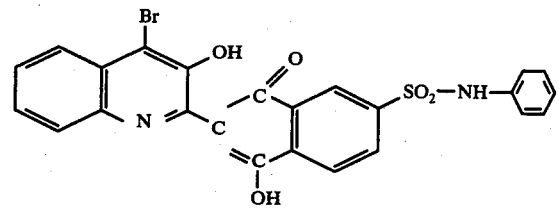

are obtained. The dyestuff gives yellow dyeings of good fastness properties on polyester materials.

EXAMPLE 78

7.5 parts of 3-hydroxy-quinophthalone-4-sulphonic acid phenyl ester (obtained according to Example 1) are suspended in 300 parts of glacial acetic acid and 7 parts of bromine are added. The reaction mixture is stirred for 15 hours at room temperature and is then filtered. The filter residue is washed with bisulphite solution and water and dried. 8.4 parts of the dyestuff of the formula

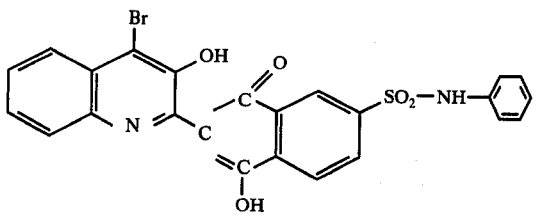

which contains 15% of bromine are obtained.

The dyestuff gives yellow dyeings of good fastness properties on polyester materials.

EXAMPLE 79

1 part of the dyestuff mentioned in Example 1, which has beforehand been brought to a finely divided state in the presence of dispersing agents, is dispersed in 400 parts of water. 100 parts of polyester fibres (polyethylene terephthalate) are dyed in the resulting dyebath in the presence of 15 parts of o-cresotic acid methyl ester as a carrier, for 120 minutes at the boil. A strong reddish-tinged yellow dyeing of good fastness properties, especially of good fastness to light and sublimation, is obtained.

Clear yellow dyeings, which are also strong, are obtained if instead of the dyestuff mentioned in Example 1, 1 part of the dyestuffs obtained in Examples 2 to 6, 11, 14, 16 to 18, 20 to 22, 30, 31, 37, 39, 40, 41, 44, 45, 51, 54 to 56, 58, 59, 61 and 62 is employed in the above dyeing procedure.

EXAMPLE 80

100 parts of polyester fibres (polyethylene terephthalate) are dyed with 1 part of the dyestuff mentioned in Example 38, which has beforehand been brought to a finely divided state with the customary auxiliaries, in 3,000 parts of water for one hour at 125°–130° under pressure. A clear golden yellow dyeing of good fastness properties is obtained.

If instead of the dyestuff mentioned in Example 38, 1 part of the dyestuffs described in Examples 7, 12, 13, 15, 23 to 29, 43, 46 to 50, 52, 53, 63 to 67, 71 to 73 or 75 is used, clear yellow dyeings of good fastness properties are again obtained.

EXAMPLE 81

A woven fabric of polyester fibres (polyethylene terephthalate) is impregnated on a padder with a liquor which contains, per liter, 20 g of the dyestuff described in Example 1, which has beforehand been brought to a finely divided state in the presence of dispersing agents. The fabric is squeezed off to a weight pick-up of 70% and is dried at 100°. To fix the dyeing, the fabric is then treated for 60 seconds at 190°–220° with hot air, rinsed, washed hot and dried. A clear golden yellow dyeing of good fastness properties is obtained.

If instead of the abovementioned dyestuff, 20 g of the dyestuffs prepared according to Examples 8 to 10, 19, 32 to 36, 41, 57 to 60 or 68 to 78 are used, clear yellow dyeings of good fastness properties are again obtained.

EXAMPLE 82

A previously cleaned and thermoset woven fabric of polyethylene terephthalate is printed with a paste consisting of the following components: 20 of dyestuff obtained according to Example 1, in a finely divided form, 520 g of water, 450 g of 1:2 crystal gum and 10 g of cresotic acid methyl ester. To fix the dyestuff, the printed and dried goods are treated with hot air for 40 seconds at 200°. After soaping, rinsing and drying, a clear golden yellow print of good fastness properties is obtained.

Clear prints of good fastness properties are also obtained if instead of the abovementioned dyestuff, 20 g of rhe dyestuffs prepared according to Examples 2, 3, 5 to 7, 16 to 18, 37 to 40 or 44 to 49 are used.

EXAMPLE 83

100 parts of a polyamide woven fabric are dyed with 1 part of the dyestuff described in Example 1, which has beforehand been brought to a finely divided state in accordance with the customary methods, in 4,000 parts of water for 1 hour at 100°. The fabric is subsequently rinsed warm and cold, and dried. A yellow dyeing of good fastness to washing and to light is obtained.

EXAMPLE 84

A dyebath is prepared with 1 part of the dyestuff mentioned in Example 37, which has beforehand been brought to a finely divided state using the auxiliaries customary for this purpose, 6 parts of fat alcoholsuphonate and 3,000 parts of water and 100 parts of cellulose triacetate fibres are dyed in this bath for 1 hour at 100°. A yellow dyeing of good fastness to washing, thermosetting and light is obtained.

EXAMPLE 85

A mixture of 1 part each of the dyestuffs prepared according to Examples 39 and 56, which has beforehand been brought to a finely divided state in the presence of dispersing agents, is dispersed in 400 parts of water. 100 parts of polyester fibres (polyethylene terephthalate) are dyed in the resulting dyebath, in the presence of 15 parts of o-cresotic acid method ester as a carrier, for 120 minutes at the boil. A very strong golden yellow dyeing of good fastness properties is obtained.

Comparable strong golden yellow dyeings are obtained if the procedure described above is followed, but 2 parts of a dyestuff mixture of the dyestuffs described in Examples 39 and 56 are used whilst varying the ratio of the two dyestufffs from 2:8 to 8.2 and especially from 4:6 to 6:4.

Comparably strong polyester dyeings are obtained if, in the above Example, 2 parts of a mixture of the dyestuffs from the following Examples are employed:

| Dyestuff from | and | Dyestuff from | Mixing ratio from | to |
|---|---|---|---|---|
| Example 39 | | Example 59 | 2 : 8 | 8 : 2 |
| Example 37 | | Example 59 | 2 : 8 | 8 : 2 |
| Example 1 | | Example 37 | 2 : 8 | 8 : 2 |
| Example 1 | | Example 59 | 2 : 8 | 8 : 2 |
| Example 1 | | Example 2 | 2 : 8 | 8 : 2 |
| Example 17 | | Example 37 | 2 : 8 | 8 : 2 |
| Example 2 | | Example 17 | 2 : 8 | 8 : 2 |

EXAMPLE 86

A mixture of 0.5 part of the quinophthalone dyestuff obtained according to Example 38 and 0.5 part of 3-hydroxy-quinophthalone-4'-N-dimethyl-sulphamide (described in British Patent Specification No. 1,363,131, Example 262, which has beforehand been brought to a finely divided state in the presence of dispersing agents, is dispersed in 400 parts of water. 100 parts of polyester fibres (polyethylene terephthalate) are dyed in the resulting dyebath in the presence of 15 parts of o-cresotic acid methyl ester as the carrier for 120 minutes at the boil. A very strong yellow dyeing of good fastness properties is obtained.

Comparable yellow dyeings are obtained if the procedure described above is followed but a mixture of the two dyestuffs in the ratio of 4 : 6 to 6 : 4 is used.

Comparable polyester dyeings are obtained if, in the above Example, 1 part of a mixture of the dyestuffs of the Examples which follow, in the mixing ratio indicated, is employed:

| Dyestuff according to present Application | and | Dyestuff according to British Patent Specification 1,363,131 | Mixing ratio from | to |
|---|---|---|---|---|
| Example 38 | | Example 261 | 4 : 6 | 6 : 4 |
| Example 39 | | Example 263 | 4 : 6 | 6 : 4 |
| Example 56 | | Example 262 | 4 : 6 | 6 : 4 |

EXAMPLE 87

17.5 parts of phthalic acid-4-N-methoxypropylsulphamide (obtained by reaction of phthalic acid-4-sulphonic acid chloride with 3-methoxypropylamine) are converted into the anhydride by heating to 175°–180° in 260 parts of odichlorobenzene. In the course thereof, the water produced is distilled off together with 60 parts of o-dichlorobenzene. 12 parts of benzoic acid and 10.15 parts of 3-hydroxyquinaldine-4-carboxylic acid are then introduced under a nitrogen atmosphere and the reaction mixture is stirred at 170°–180° until the formation of the dyestuff is complete; in the course thereof, again, the water produced is distilled off together with a little o-dichlorobenzene. Thereafter the remaining o-dichlorobenzene is largely distilled off under reduced pressure, the residue which remains is diluted with 80 parts of methanol, and the mixure is cooled to 15 –20°. The reaction product which has separated out is filtered off and ashed with methanol. After drying, 16.6 parts of the dyestuff of the formula

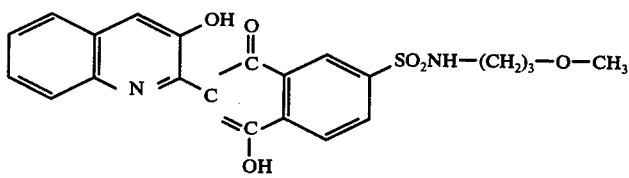

are obtained. On polyester materials the dyestuff gives a golden yellow dyeing of good fastness properties.

EXAMPLE 88

18.2 parts of phthalic acid-4-N-ethoxypropylsulphamide (obtained by reaction of phthalic acid-4-sulphonic acid chloride with 3-ethoxypropylamine) are introduced into 200 parts of 2,4-dichlorotoluene and converted to the anhydride by heating to 175°–180°. In the course thereof, the water produced is distilled off together with 50 parts of 2,4-dichlorotoluene. Thereafter, 12 parts of benzoic acid and 7.95 parts of 3-hydroxyquinaldine are added to the melt under a nitrogen atmosphere and the reaction mixture is stirred at 170°–180° until the formation of the dyestuff is complete. In the course thereof, again, the water produced is distilled off together with a little 2,4-dichlorotoluene. After removing the residual solvent by distillation under reduced pressure the residue which remains is stirred with 80 ml of methanol, the mixture is cooled to 15°–20° and filtered, and the filter residue is rinsed well with methanol. After drying, 16 parts of the dyestuff of the formula

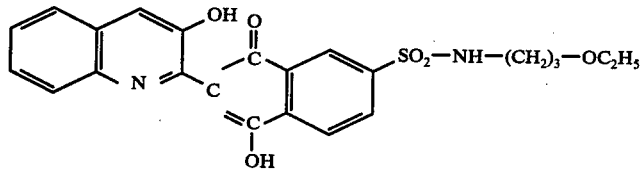

are obtained. On polyester materials, the dyestuff gives a reddish-tinged yellow dyeing of good fastness properties.

EXAMPLES 89–109

Analogously to the description in Examples 1 and 2, the 3-hydroxyquinophthalone dyestuffs of the general formula

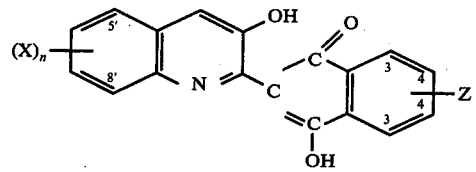

listed in the Table which follows are obtained on using the corresponding phthalic acid derivatives or their anhydrides:

| Example | X | n | Z | Shade on polyester |
|---|---|---|---|---|
| 89 | H | — | 4-SO$_2$NH—(CH$_2$)$_3$—O—C$_4$H$_9$ | neutral yellow |

| Example | X | n | Z | Shade on polyester |
|---|---|---|---|---|
| 90 | H | — | 4-SO$_2$NH—(CH$_2$)$_3$—O—CH$_2$—CH(C$_2$H$_5$)(C$_4$H$_9$) | yellow |
| 91 | H | — | 4-SO$_2$NH—(CH$_2$)$_2$—O—CH$_3$ | golden yellow |
| 92 | H | — | 4-SO$_2$NH—(CH$_2$)$_2$—O—C$_2$H$_5$ | golden yellow |
| 93 | H | — | 4-SO$_2$NH—(CH$_2$)$_2$—O—C$_4$H$_9$ | medium yellow |
| 94 | H | — | 4-SO$_2$N(CH$_3$)—(CH$_2$)$_3$—O—CH$_3$ | reddish-tinged yellow |
| 95 | H | — | 4-SO$_2$N(C$_2$H$_5$)—(CH$_2$)$_2$—O—C$_2$H$_5$ | yellow |
| 96 | 5',7'-CH$_3$ | 2 | 4-SO$_2$NH—(CH$_2$)$_3$—O—C$_3$ | yellow |
| 97 | 5'-C$_2$H$_5$ | 1 | 4-SO$_2$NH—(CH$_2$)$_3$—O—CH$_3$ | yellow |
| 98 | 6',8'-Cl | 2 | 4-SO$_2$NH—(CH$_2$)$_3$—O—CH$_3$ | yellow |
| 99 | 6',8'-Br | 2 | 4-SO$_2$NH—(CH$_2$)$_3$—O—CH$_3$ | yellow |
| 100 | 6'-Br | 1 | 4-SO$_2$NH—(CH$_2$)$_3$—O—CH$_3$ | yellow |
| 101 | H | — | 4-SO$_2$NH—(CH$_2$)$_2$—O—C$_6$H$_5$ | yellow |
| 102 | H | — | 4-SO$_2$NH—(CH$_2$)$_2$—O—CH(CH$_3$)$_2$ | golden yellow |
| 103 | H | — | 3-SO$_2$NH—(CH$_2$)$_3$—O—CH$_3$ | reddish-tinged yellow |
| 104 | H | — | 3-SO$_2$NH—(CH$_2$)$_3$—O—C$_2$H$_5$ | reddish-tinged yellow |
| 105 | H | — | 4-SO$_2$NH—(CH$_2$)$_4$—O—CH$_3$ | golden yellow |
| 106 | H | — | 4-SO$_2$N(CH$_3$)—(CH$_2$)$_3$—O—C$_2$H$_5$ | golden yellow |
| 107 | H | — | 4-SO$_2$N(C$_2$H$_5$)—(CH$_2$)$_3$—O—C$_2$H$_5$ | yellow |
| 108 | H | — | 4-SO$_2$N(CH$_3$)(CH$_2$)$_2$—O—CH$_3$ | golden yellow |
| 109 | H | — | 4-SO$_2$N(C$_2$H$_5$)(CH$_2$)$_2$—O—CH | yellow |

EXAMPLE 110

5 parts of 3-hydroxy-quinophthalone-4'-N-ethoxypropyl-sulphamide (prepared according to Example 88) are suspended in 200 parts of glacial acetic acid and 4.5 parts of bromine are added. The reaction mixture is stirred for 15 hours at room temperature and is then filtered. The residue is washed with bisulphite solution and water, and dried. 5.4 g of the dyestuff of the formula

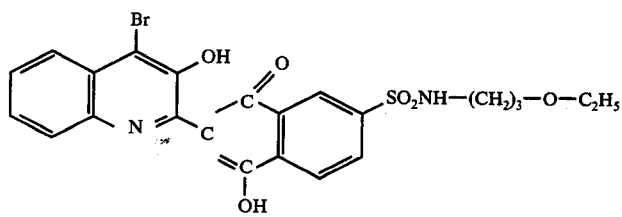

which contains 14.6% of bromine are obtained.

The dyestuff gives yellow dyeings of good fastness properties, especially good fastness to sublimation, also polyester materials.

EXAMPLE 111

1 part of the dyestuff mentioned in Example 87, which has beforehand been brought to a finely divided state in the presence of dispersing agents, is dispersed in 400 parts of water. 100 parts of polyester fibres (polyethylene terephthalate) are dyed in the resulting dyebath in the presence of 15 parts of o-cresotic acid methyl ester as the carrier for 120 minutes at the boil. A strong clear golden yellow dyeing of good fastness properties, especially good fastness to light and sublimation, is obtained.

Clear yellow dyeings which are also strong are obtained if in place of the dyestuff mentioned in Example 87 1 part of the dyestuff obtained in Examples 88, 91, 92, 94, 102, 103, 104 or 105 is employed in the above dyeing procedure.

EXAMPLE 112

100 parts of polyester fibres (polyethylene terephthalate) are dyed with 1 part of the dyestuff obtained in Example 89, which has beforehand been brought to a finely divided state with the customary auxiliaries, in 3,000 parts of water for one hour at 125°– 130° under pressure. A strong clear yellow dyeing of fastness properties is obtained.

If instead of the dyestuff described in Example 89, 1 part of the dyestuffs described in Examples 88, 93, 95, 96, 97, 106, 107 or 110 is used, clear strong yellow dyeings of good fastness properties, especially of good fastness to sublimation, are again obtained.

EXAMPLE 113

A previously cleaned and thermoset woven fabric of polyethylene terephthalate is printed with a paste consisting of the following components: 20 g of dyestuff obtained according to Example 89, in a finely divided form, 520 g of water, 450 g of 1:2 crystal gum and 10 g of cresotic acid methyl ester. To fix the dyestuff, the printed and dried goods are treated with hot air for 40 seconds at 200°. After soaping, rinsing and drying, a clear golden yellow print of good fastness to light and to sublimation is obtained.

Yellow prints which are also very clear and have good fastness to light and fastness to sublimation are obtained if instead of the abovementioned dyestuff, 20 g of the dyestuffs described in Examples 88, 94, 108 or 110 are used.

EXAMPLE 114

A woven fabric of polyester fibres (polyethylene terephthalate) is impregnated on a padder with a liquor which contains, per liter, 2 g of the dyestuff described in Example 87, which has beforehand been brought to a finely divided state in the presence of dispersing agents. The fabric is squeezed off to a weight pick-up of 70% and is dried at 100°. A strong golden yellow dyeing of good fastness to light, sublimation and rubbing is obtained.

If instead of the abovementioned dyestuff, 20 g of the dyestuffs mentioned in Examples 90, 93, 98, 99, 100 and 101 are used, strong yellow dyeings of good fastness properties, especially good fastness to sublimation, are again obtained.

EXAMPLE 115

100 parts of a polyamide woven fabric are dyed with 1 part of the dyestuff described in Example 87, which has beforehand been brought to a finely divided state in accordance with the customary methods, in 4,000 parts of water for 1 hour at 100°. The fabric is subsequently rinsed warm and cold, and dried. A yellow dyeing of good fastness to washing and to light is obtained.

EXAMPLE 116

A dyebath is prepared with 1 part of the dyestuff mentioned in Example 88, which has beforehand been brought to a finely divided state using the auxiliaries customary for this purpose, 6 parts of fat alcohol-sulphonate and 3,000 parts of water and 100 parts of cellulose triacetate fibres are dyed in this bath for 1 hour at 100°. A yellow dyeing of good fastness to washing, thermosetting and light is obtained.

We claim:

1. Water-insoluble quinophthalone dyestuff of the formula

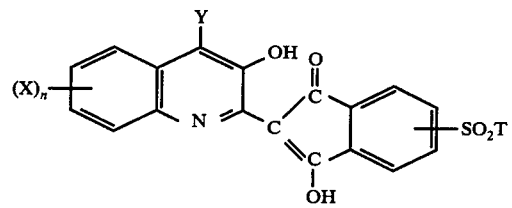

wherein

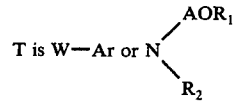

Ar is phenyl, naphthyl, mono-, di-, or tri-substituted phenyl, or mono-, di- or tri-substituted naphthyl where the substituents are chlorine, bromine, $C_1$-$C_4$-alkyl, $C_1$-$C_4$-alkoxy, phenyl, phenoxy, cyano, nitro, methylmercapto, methoxycarbonyl, or hydroxy;

W is oxygen, sulfur, or

R is hydrogen, $C_1$-$C_4$-alkyl, or $C_1$-$C_4$-alkyl substituted by cyano, hydroxy, methoxy, or chloro;

A is straight-chain or branched-chain $C_2$-$C_6$-alkylene or $C_2$-$C_6$-alkylene interrupted in its chain by oxygen;

$R_1$ is $C_1$-$C_4$-alkyl, cyano-$C_1$-$C_4$-alkyl, hydroxy-$C_1$-$C_4$-alkyl, methoxy-$C_1$-$C_4$-alkyl, chloro-$C_1$-$C_4$-alkyl, phenyl, naphthyl, mono-, di-, or tri-substituted phenyl, or mono-, di-, or tri-substituted naphthyl where the substituents are chlorine, bromine, $C_1$-$C_4$-alkyl, $C_1$-$C_4$-alkoxy, phenyl, phenoxy, cyano, nitro, methylmercapto, methoxycarbonyl, or hydroxy;

$R_2$ is hydrogen, $C_1$-$C_4$-alkyl or $C_1$-$C_4$-alkyl substituted by cyano, hydroxy, methoxy, or chloro;

X is chlorine, bromine, $C_1$-$C_4$-alkyl, methoxy-$C_1$-$C_4$-alkyl, chloro-$C_1$-$C_4$ alkyl, $C_1$-$C_4$-alkoxy, nitro, or $C_1$-$C_4$-alkylcarbonylamino;

Y is halogen, chlorine, or bromine; and n is a number from 0 to 3.

2. Quinophthalone dyestuff of claim 1 wherein $R_1$ is $C_1$-$C_4$-alkyl, phenyl, or phenyl which is mono-, di- or tri-substituted with chloro or methyl;

X is chlorine, bromine, $C_1$-$C_4$-alkoxy, $C_1$-$C_4$-alkyl, cyano-$C_1$-$C_4$-alkyl, hydroxy-$C_1$-$C_4$-alkyl, methoxy-$C_1$-$C_4$-alkyl, chloro-$C_1$-$C_4$-alkyl, nitro, or $C_1$-$C_4$-alkylcarbonylamino;

Y is hydrogen or bromine; and n is the number 0, 1, or 2.

3. Quinophthalone dyestuffs according to claim 1, wherein

A represents —$(CH_2)_m$—,

X represents Cl, Br, $CH_3$ or $CH_3O$,

Y represents H or Br, $R_1$ represents $CH_3$ or $C_2H_5$, $R_2$ represents H, $CH_3$ or $C_2H_5$, n represents 0, 1 or 2 and m represents 2, 3 or 4.

4. Quinophthalone dyestuffs according to claim 1, wherein n represents 0.

5. Quinophthalone dyestuff according to Claim 1, wherein

A represents —$C_3H_6$—, $R_1$ represents $OCH_3$, $R_2$ and Y represent H and n represents 0.

6. Quinophthalone dyestuffs according to Claim 1, wherein

T represents W—Ar.

7. Quinophthalone dyestuffs according to Claim 6, wherein

Ar represents phenyl, or phenyl which is monosubstituted, disubstituted or trisubstituted by Cl, Br, $C_1$-$C_4$-alkyl, $C_1$-$C_4$-alkoxy, cyano, phenyl or phenoxy, R represents H or $C_1$-$C_4$-alkyl, X represents Cl, Br, $C_1$-$C_4$-alkoxy, $C_1$-$C_4$-alkyl, $NO_2$ or $C_1$-$C_4$-alkylcarbonylamino, Y represents H, Cl or Br, n represents 0–2.

8. Quinophthalone dyestuffs according to claim 7, wherein

Ar denotes phenyl, chlorophenyl, dichlorophenyl, tolyl, methoxyphenyl, dimethylphenyl and trimethylphenyl, X denotes Cl, Br, $CH_3$ or $CH_3O$, Y denotes H or Br, W denotes O or NR, R denotes H, $CH_3$ or $C_2H_5$ and n denotes 0, 1 or 2.

9. Quinophthalone dyestuffs according to claim 7, wherein

W represents NR.

* * * * *